United States Patent [19]
Brandenberger

[11] Patent Number: 5,404,994
[45] Date of Patent: Apr. 11, 1995

[54] AGRICULTURAL CONVEYOR BELT

[75] Inventor: Harry F. Brandenberger, Sedgwick, Kans.

[73] Assignee: Legg Company, Incorporated, Halstead, Kans.

[21] Appl. No.: 110,311

[22] Filed: Aug. 23, 1993

[51] Int. Cl.⁶ .............................................. B65G 15/42
[52] U.S. Cl. ................................. 198/690.2; 198/699
[58] Field of Search ...................... 198/690.2, 698, 699, 198/847

[56] References Cited

U.S. PATENT DOCUMENTS

| | | |
|---|---|---|
| 254,686 | 3/1882 | Park, Jr. |
| 260,889 | 7/1882 | Northcutt |
| 313,777 | 3/1885 | Sells |
| 316,727 | 4/1885 | Blum et al. |
| 329,062 | 10/1885 | Miller |
| 331,948 | 12/1885 | Dickinson |
| 369,164 | 8/1887 | Coddington |
| 384,458 | 6/1888 | Mathews |
| 417,065 | 10/1885 | Miller |
| 434,565 | 8/1890 | Nelson |
| 845,269 | 2/1907 | Schaffner |
| 1,435,600 | 11/1922 | Graham .................. 198/699 |
| 2,286,055 | 6/1942 | Brittell |
| 2,305,044 | 12/1942 | Toews |
| 2,400,667 | 5/1946 | Toews |
| 4,316,536 | 2/1982 | Verbeek |
| 5,141,101 | 8/1992 | Vance et al. .................. 198/847 |

FOREIGN PATENT DOCUMENTS 235670 3/1960 Australia.
519079 9/1938 United Kingdom.

OTHER PUBLICATIONS

Sparks brochure entitled "Cleated Belting".
Legg Company brochure entitled "Swather/Windrower Canvas".

Primary Examiner—Joseph E. Valenza
Attorney, Agent, or Firm—Hill, Steadman & Simpson

[57] ABSTRACT

A conveyor belt for agricultural use, and method of manufacturing same, having a conveyor belt fabric material of preferably synthetic fibers with rubber coating and having wooden slats arranged spaced apart along its length, oriented transverse of the belt. The wooden slats are sealed to the belt to prevent weeds and stalks from penetrating between the slats and the belt material. The wooden slats can be adhesively secured directly to the belt or can be adhesively secured to a strip of uncured rubber, and the uncured rubber strip can be cured together with the rubber of the conveyor belt material to adhesively secure the slat to the belt material. Additionally, rivets or other mechanical means can be used to secure the wooden slat to the belt material. A method for applying a plurality of slats to the belt material and coiling the end product is described.

6 Claims, 1 Drawing Sheet

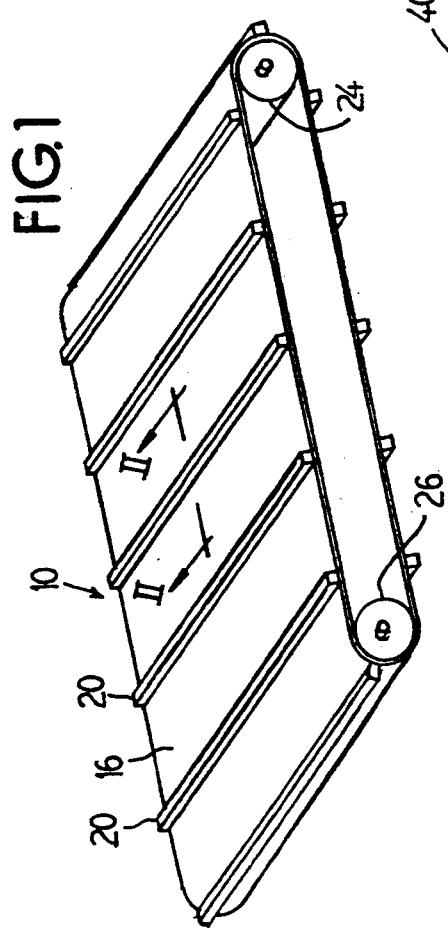
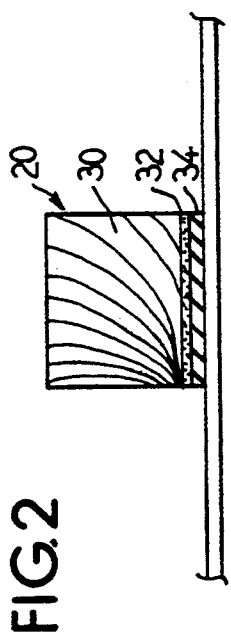
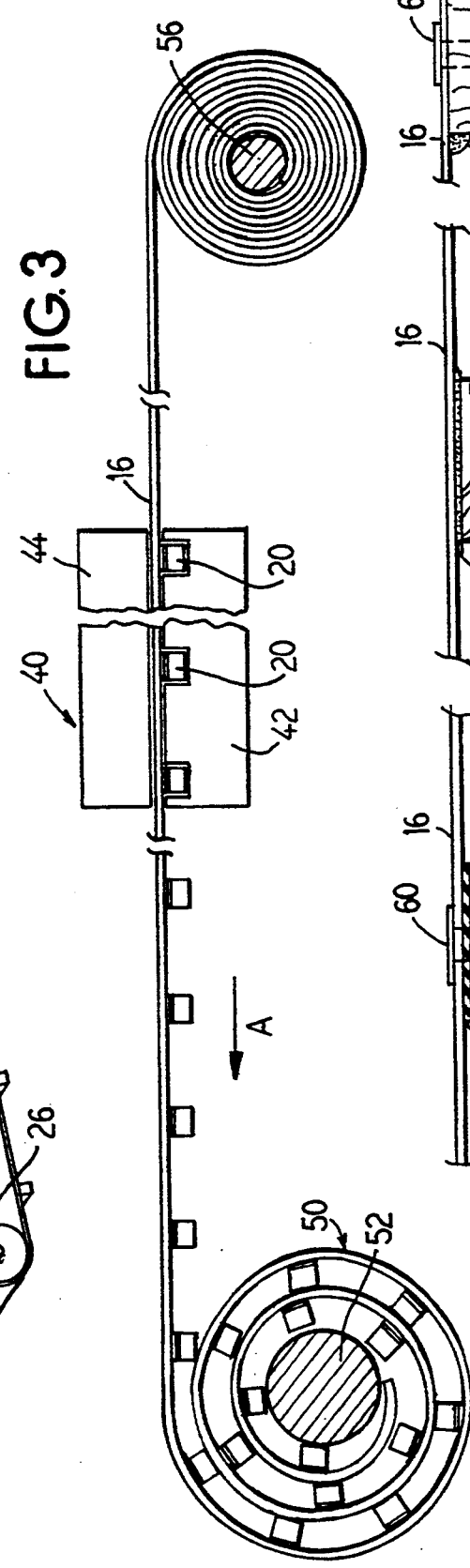
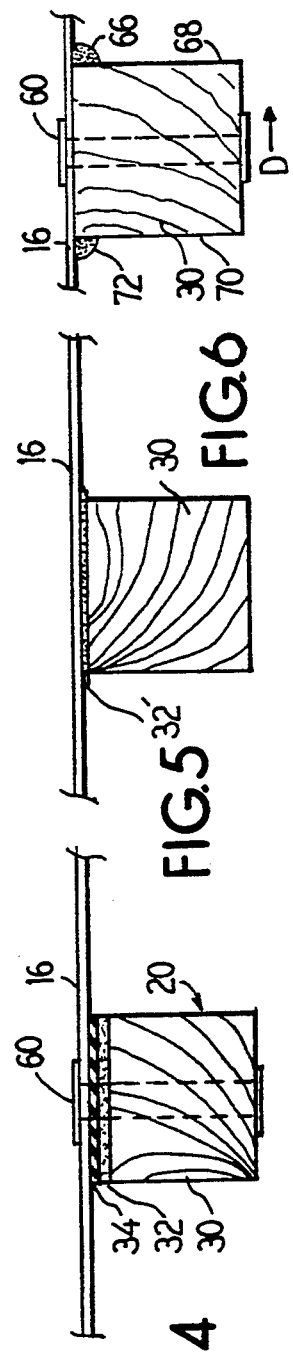
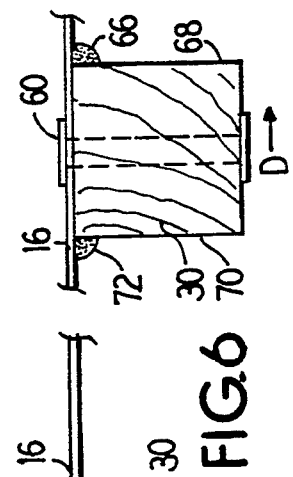

AGRICULTURAL CONVEYOR BELT

BACKGROUND OF THE INVENTION

The present invention relates to conveyor belts, and in particular to conveyor belts for agricultural machinery. The present invention relates to a novel means of attaching wooden slats to conveyor belt material.

Various types of conveyor belts for agricultural use are known. U.S. Pat. No. 4,316,536 discloses a web-woven from an extruded nylon cord and having a polyvinyl chloride coating with a plurality of transverse, spaced vinyl slats heat sealed thereto. U.S. Pat. No. 384,458 discloses slats sandwiched between two belts. U.S. Pat. No. 2,286,055 discloses rubber slats vulcanized onto a conveyor belt. U.S. Pat. No. 2,305,044 also discloses rubber slats vulcanized to the conveyor material. Australian Patent No. 235,670 discloses resilient plastic slats adhesively attached to the belt. British specification 519,079 discloses wooden slats held onto a belt by a resilient slot without any additional attachment means disclosed.

It has been found that wooden slats fastened to canvas or rubber belts perform exceptionally well compared to rubber slats formed of the same material as the belt, or plastic slats. One drawback however to a mechanically fastened wooden slat to the belt material is that stalks or stem material can be lodged between the belt material and the wooden slat which after time can cause the wooden slat to become separated from the belt material. When the wooden slat is mechanically attached to the belt such as by staples, the stalk or stem material can pull the staple through the fabric, shortening the life of the belt. Therefore, it would be advantageous to provide a conveyor belt having affixed thereto wooden slats which would prevent the pick up of stems or stalks or other debris between the belt and the wooden slat.

SUMMARY OF THE INVENTION

It is object of the present invention to provide a conveyor belt and a method of construction thereof having a canvas belt, or rubber belt, or rubber coated canvas belt, or other flexible material belt with wooden slats arranged intermittently along the belt and spanning transverse of the belt wherein the wooden slats would be secured such as to not pick up stalks and stems or other debris between the belt and the slat. It is an object of the invention to provide an economical and efficient method of attaching wooden slats to belts which would result in long useful life and reduce breakage or ripping of the belt.

The object is inventively achieved in that a novel method of attaching wooden slats to belt material such as rubber/canvas belts is provided wherein wooden slats are adhesively secured to the belt transversely and intermittently along the length of the belt. The wooden slats can be adhesively secured directly to the belt or each wooden slat can be adhesively secured to a thin strip of uncured rubber material and the wooden slat/rubber strip can then be cured to the surface of an uncured rubber belt or vulcanized thereto. Additionally, the wooden slat can be mechanically secured to the belt, as additional securing means, while maintaining a sealed interface along the length of the slat with the belt, such as using an adhesive interface or an adhesive/vulcanizing method using a thin rubber strip as described above. The article of the invention provides for a sealed interface between the wooden slat and the conveyor material to prevent any intrusion of stalks or weeds between the wooden slat and the rubber canvas belt.

A method of production is disclosed which provides for an efficient construction of belt material with wooden slats attached. A thin strip of uncured rubber is adhesively secured to a top side of each wooden slat and the uncured rubber canvas belt material is lowered onto a plurality of such slats. The wooden slats with rubber strips are arranged in a bottom portion of an open heated press and the rubber/canvas belt is placed thereover on top of the slats. A top portion of the press is lowered down upon the rubber/canvas belt and heat and pressure are applied to seal the slats to the belt material. The belt material with the slats adhered thereto is then rolled at a station to the side of the press which at the same time draws new belting material over the bottom portion of the press. The bottom portion of the press is reloaded with new slats with adhesively secured rubber strips. The new belt material can be rolled from a supply on an opposite side of the press.

BRIEF DESCRIPTION OF THE DRAWINGS

FIG. 1 is a prospective view of a conveyor belt of the present invention;

FIG. 2 is an enlarged sectional view taken generally along line II—II of FIG. 1;

FIG. 3 is a schematic sectional view of a method of producing the conveyor belt of the present invention;

FIG. 4 is a sectional view of an alternate construction of the present invention;

FIG. 5 is a sectional view of a second alternate embodiment of the construction of the present invention; and FIG. 6 is a sectional view of a third alternate embodiment of the present invention.

DETAILED DESCRIPTION OF THE PREFERRED EMBODIMENTS

FIG. 1 illustrates a conveyor belt 10 of the present invention. The conveyor belt has a fabric belt 16 composed of canvas or canvas/rubber material, or any other suitable flexible material, and having a plurality of intermittent slats 20 arranged along its length. A first roller 24 and a second roller 26 progress the conveyor belt as is known. This conveyor belt can be a part of mobile farm equipment such as a swather or a swather/windrower. The slats are preferably placed approximately one foot apart along the length of the material 16.

FIG. 2 shows the inventive construction of the present invention. The slat 20 comprises a wooden slat 30, adhesive layer 32, and a rubber strip 34. The wooden slat 30 is first attached to the rubber strip 34 by the adhesive layer 32. An advantageous adhesive is a rubber to metal adhesive such as CHEMLOCK 250 manufactured by the Lord Corporation, Chemical Products Group of Erie, Pa. The rubber strip 34 is uncured and is approximately 0.02 inches thick. The rubber strip is rolled down the wooden slat to set with the adhesive.

As shown in FIG. 3, the wooden slats 20 are placed in succession in a press 40, particularly in a lower half 42 of the press with the rubber strip 34 facing upwardly. The belt 16 is lowered onto the slats 20 and an upper portion 44 of the press is lowered thereto. The material 16 and the rubber strip 34 comprise uncured rubber at this point. The press is closed and both the rubber strip 34 and the belt 16 are cured at 295°–300° fahrenheit for 12 minutes at 110 pounds per square inch bonding and sealing the wood slat 20 to the belt 16. After this step, the top of the press 44 is lifted upward and the belt 16 is translated to the left in the direction "A" and rolled in a bundle 50 by a roll 52. New slats 20 are inserted into the press 40 and new belt material 16 is unrolled simultaneously from a spool 56.

FIG. 4 shows an alternate embodiment of the invention wherein the slat 20 is further attached by a plurality of rivets 60 spaced along a length of the slat 20. The adhesive layer 32 and the rubber layer 34 are still used and serve a sealing function.

FIG. 5 shows a further embodiment wherein the wooden slat 30 is adhesively glued directly to the fabric 16 by a layer of adhesive 32'. In this case, the intermediate step of first gluing a strip of rubber 34 to the wooden slat is eliminated and the wooden slat 30 is directly glued to a cured rubber/canvas belt 16. An adhesive or cement is selected for adhering wood to a cured rubber surface for a cured rubber belt and other types of cement or adhesive are selected depending on the materials to be joined. The embodiment of FIG. 5 can also utilize mechanical connectors such as the rivets 60 of FIG. 4.

FIG. 6 shows a still further embodiment wherein the wooden slat 30 is mechanically secured to the belt and a sealing line of adhesive 66 is used on at least a front side 68 of the wooden slat 30 which faces the approaching agricultural product, that is, the direction D of circulation of the belt 10 causes the front side 68 to lead into the agricultural product. This sealing line of adhesive 66 prevents penetration of debris, stems, etc. between the cleat 30 and the belt 16. The trailing side 70 can also have a sealing line 72 of adhesive.

Although the present invention has been described with reference to a specific embodiment, those of skill in the art will recognize that changes may be made thereto without departing from the scope and spirit of the invention as set forth in the appended claims.

I claim as my invention:

1. A conveyor belt comprising:
a length of conveyor belt material having a plurality of wooden slats attached thereto arranged transversely and spaced apart, each of said wooden slats sealed to said conveyor belt material along at least one line along a length of said wooden slats and each of said wooden slats has a leading face substantially exposed and said adhesive sealing prevents conveyed material from passing between the slat and the belt material.

2. The conveyor belt according to claim 1 wherein each of said wooden slats are sealed to the belt material substantially along the entire width of each of said wooden slats.

3. The conveyor belt according to claim 1 wherein each of said wooden slats are further secured to said conveyor belt material by a plurality of mechanical attachments.

4. The conveyor belt according to claim 1 wherein each of said wooden slats are further secured to said conveyor belt material by a plurality of rivets along the length of each of said wooden slats.

5. The conveyor belt according to claim 1 wherein each of said wooden slats are sealed to said conveyor belt by a layer of adhesive and a strip of rubber material, said layer of adhesive between each of said wooden slat and said strip of rubber material, said strip of rubber material cured to said conveyor belt material.

6. The conveyor belt according to claim 1, wherein said wooden slats have a rectangular cross section with a first side arranged flushly to said conveyor belt material and adhesively sealed to said conveyor belt material over an area of said first side, and a second side diametrically opposite said first side and substantially exposed, and a third side being a trailing side in the direction of belt progression and also substantially exposed, and said leading face is on a fourth side, diametrically opposite said third side.

* * * * *